: 3,518,155
Patented June 30, 1970

3,518,155
BOND STRENGTH BETWEEN RUBBER AND TEXTILES
Helmut Freytag, Cologne-Stammheim, Ivo Dane and Erwin Muller, Leverkusen, and Guido Fromandi, Schildgen, Germany, assignors to Farbenfabriken Bayer Aktiengesellschaft, Leverkusen, Germany, a corporation of Germany
No Drawing. Filed Aug. 16, 1966, Ser. No. 572,661
Claims priority, application Germany, Sept. 18, 1965, F 47,241
Int. Cl. B32b 25/08, 27/05, 27/42
U.S. Cl. 161—92                                    5 Claims

ABSTRACT OF THE DISCLOSURE

Vulcanizable rubber mixture containing (a) tetramethylolacetylene-diurea or said diurea having one or more of its hydroxyl groups etherified or esterified and (b) 1,5-dihydroxynaphthalene or at least one benzene derivative substituted in the m-position by amino and/or hydroxyl and/or etherified or esterified hydroxyl groups or a condensate thereof with a ketone or an aldehyde and the utility thereof in producing rubber/fabric articles having the fabric bonded to said rubber.

Textiles are worked into a large number of rubber products, for example, car tires, conveyor belts and hoses, in order to strengthen or to reinforce them. One important requirement in such cases is that there should be a firm bond between the rubber and the fabric a requirement which cannot be satisfied unless special measures are taken, particularly with the increasing popularity of semi- and fully synthetic fabrics.

In order to obtain a bond of adequate strength between rubber and textiles, the textiles have until now usually been provided with pre-impregnations. Nowadays, such impregnations are generally based on latices of elastomers and formaldehyde resins dissolved or dispersed in water. Normally, the formaldehyde resins are not fully condensed, being further condensed as processing continues by the addition of formaldehyde. In many cases, the bond strength obtained by such impregnations is inadequate.

We have now found that the bond strength between rubber and textiles can be increased very substantially by adding to the vulcanizable mixture based on natural or synthetic rubber which is applied to the textile material: a mixture containing on the one hand tetramethylol-acetylene-diurea, all or some of whose hydroxyl groups are optionally etherified or esterified, and on the other hand additionally benzene derivatives substituted in the m-position by amino- and/or optionally etherified or esterified hydroxy groups, or their condensates with ketones or aldehydes or, instead of the benzene derivatives, 1,5-dihydroxynaphthalene. The bond or adhesion of the rubber both to pre-impregnated and to non-impregnated textiles is improved by this treatment. Among the non-impregnated fibrous materials, a particularly marked effect is obtained in the case of polyamide materials.

The tetramethylol-acetylene-diurea according to the invention need not be pure. It is even possible to use products containing a somewhat smaller amount of formaldehyde, or relatively high molecular weight condensation products. The tetramethylol-acetylene-diurea is prepared in a conventional manner, for example, in accordance with Houben-Weyl: "Makromolekular Chemie," II, p. 353.

As already mentioned, esters and ethers which can be regarded as masked methylol compounds, may be used instead of the tetramethylol-acetylene-diurea. Lower alkyl ethers such as, for example, methyl-, ethyl-, propyl-, butyl- and allyl ethers, in which all the hydroxy groups can be etherified are particularly suitable. Suitable esters include, in particular, lower aliphatic carboxylic acid ester such as acetates and propionates.

Resorcinol is preferably used as the benzene derivative. Further examples of such compounds are m-aminophenol, m-phenylene diamine, resorcinol diacetate, or propionate or butyrate, or resorcinol monomethylether or propylether.

Examples of condensation products with carbonyl compounds include incompletely condensed resins of resorcinol with formaldehyde in a molar ratio of approximately 1:0.5 to 1:0.9, or condensates of resorcinol with acetaldehyde in a molar ratio of approximately 1:0.5 to 1:1, or condensates of resorcinol with acetone in a molar ratio of approximately 1:0.5 to 1:2.

The tetramethylol-acetylene-diurea according to the invention are mixed into the rubber mixture to be applied to the textiles in quantities of, for example, 0.2% to 8% by weight, preferably 0.5% to 4% by weight (based on the rubber). The adhesion-promoting effect is improved very considerably by the addition of resorcinol or other m-substituted benzene derivatives in approximately equivalent quantities, in particular in quantities of from one-half to twice the equivalent quantities. When the resorcinol is being mixed, the temperature of the mixture should be above the melting point of resorcinol (above approximately 115° C.). Even in cases where the other benzene derivatives referred to above are used, it is of advantage to keep the temperature of the rubber mixture above the melting point of these substances during their addition.

Suitable types of rubber for the mixture include both natural and synthetic rubbers such as copolymers of butadiene-styrene, butadiene-acrylonitrile, isobutylene-isoprene, ethylene-propylene (usually with a third component), as well as polyisoprene, polybutadiene and polychloro-butadiene and blends thereof.

Suitable textiles include filaments (cord filaments in particular) and fabrics woven or knitted from various kinds of fibre, such as rayon, polyamide, polyester, polyacrylonitrile and cotton fibres. The adhesion-promoting pre-impregnation of the textiles may be carried out in one of the impregnating baths commonly used in the art containing, for example, latices based on natural rubber, butadiene-styrene-, butadiene-, acrylonitrile-, chlorobutadiene- and butadiene-styrene-vinyl-pyridine polymers or their blends and, preferably resorcinol-formaldehyde-resins.

The textiles are coated with the rubber mixture according to the invention by the processes normally used in the rubber industry. The end products also are vulcanized by conventional processes.

The invention is illustrated by the following examples.

EXAMPLE 1

Two tire carcass mixtures of the following composition were prepared on a set of mixing rolls:

|  | Parts by weight | |
|---|---|---|
|  | Mixture A | Mixture B |
| Natural rubber | 100.0 | 100.0 |
| Semi-active lampblack | 20.0 | 20.0 |
| Resorcinol |  | 1.3 |
| Zinc oxide | 5.0 | 5.0 |
| Pinewood oil | 2.0 | 2.0 |
| Aromatic mineral oil | 4.0 | 4.0 |
| Phenyl-α-naphthylamine | 1.5 | 1.5 |
| Sulphur | 2.3 | 2.3 |
| Benzothiazyl-2-cyclohexylsulphenamide | 0.7 | 0.7 |
| Diphenyl guanidine | 0.1 | 0.1 |
| Tetramethylol-acetylene diurea |  | 1.0 |

In the case of the mixture B, a master batch of rubber, carbon black and resorcinol was initially prepared at a mixing temperature of 130° C. After this master batch had been cooled to approximately 100° C., the remaining components were added, followed ultimately by the addition of the tetramethylol-acetylene-diurea which had been dispersed beforehand in the aromatic mineral oil (ratio 1:1) in a ball mill. The mixture A was similarly prepared except that neither resorcinol nor tetramethylol-acetylene-diurea was added.

Rayon cord filaments (den. 1650/1 x 2) were incorporated during vulcanisation between pairs of 40 cm.-long, 3 mm.-thick and 2-cm. wide strips prepared from the aforementioned mixtures, perpendicularly of the strips and at intervals of 1.5 cm. The filaments had been impregnated beforehand with an impregnating mixture of the following composition:

| | |
|---|---:|
| Natural rubber latex (60%) | 125.0 |
| Latex of a copolymer of butadiene, styrene and vinyl pyridine (40%) | 62.5 |
| Precondensed resorcinol-formaldehyde resin | 20.0 |
| Formaldehyde solution (30%) | 20.0 |
| Water | 1872.5 |
| | 2100.0 |

Overall dry content=6%.

The filaments were heated for 10 minutes to 135° C. during the drying process.

The test specimen containing the filaments was vulcanized for 50 minutes at 138° C.

In order to determine the static bond strength, individual test specimens 1.5 cm.-long were punched out of the test strips in such a way that there was one cord filament in the middle of each (length embedded=2 cm.). After preheating to 80° C., the force required to rip the filament out of the rubber was measured in a chamber heated to 80° C.

The dynamic bond strength was determined by clamping the test strip described above in the movable part of a testing machine and heating it to 80° C. The projecting ends of the cord filaments were anchored or fixed to the stationary part of the machine. The rubber was then reciprocated 500 times per minute over a total length of 2.5 mm. (±1.25 mm). The time which passed before the cord filament was detached from the rubber under this strain was then measured. Both the bond-strength testing methods are described at length in "Bayer-Mitteilungen fur die Gummi-Industrie," No. 29, pp. 71–78.

The following bond strengths were obtained for impregnated rayon cord:

| | Mixture A | Mixture B |
|---|---|---|
| Static bond strength at 80° C. (kg.) | 6.5 | 8.9 |
| Dynamic bond strength at 80° C. (mins.) | 71 | 126 |

EXAMPLE 2

Tests similar to those described in Example 1 were conducted with non-impregnated nylon cord filaments (den. 840/1 x 2).

In addition to mixture A, a mixture C was used to embed the cord filaments. The only difference between mixture C and the aforementioned mixture B was that the quantity of resorcinol had been increased to 2.5 parts by weight and the quantity of tetramethylol-acetylene-diurea to 2 parts by weight. The bonds strengths thus obtained were as follows for non-impregnated nylon cord:

| | Mixture A | Mixture C |
|---|---|---|
| Static bond strength at 80° C. (kg.) | 1.9 | 6.1 |
| Dynamic bond strength at 80° C. (mins.) | 6 | 112 |

EXAMPLE 3

The following two rubber mixtures intended for industrial application were prepared on mixing rolls:

| | Parts by weight | |
|---|---|---|
| | Mixture A | Mixture B |
| Natural rubber | 50.0 | 50.0 |
| Styrene-butadiene rubber | 50.0 | 50.0 |
| HAF-carbon black | 20.0 | 20.0 |
| MT-carbon black | 45.0 | 45.0 |
| Resorcinol | | 2.5 |
| Zinc oxide | 5.0 | 5.0 |
| Stearic acid | 1.0 | 1.0 |
| Factice | 10.0 | 10.0 |
| Aromatic mineral oil | 3.0 | 3.0 |
| Styrenised diphenylamine | 1.5 | 1.5 |
| Benzothiazyl-2-cyclohexylsulphenamide | 1.8 | 1.8 |
| Condensation product of acroelin with aromatic bases | 1.0 | 1.0 |
| Sulphur | 2.0 | 2.0 |
| Tetramethylol-acetylene-diurea | | 2.0 |

In the case of mixture E, a master batch was again prepared from rubber, carbon black and resorcinol at a mixing temperature of 130° C. After this master batch had been cooled to approximately 100° C., the remaining components of the mixture were added, followed ultimately by the addition of the tetramethylol-acetylene-diurea which had been dispersed beforehand in the aromatic mineral oil (I:I) in a ball mill. Mixture D was similarly prepared except that neither resorcinol nor tetramethylol-acetylene-diurea was added.

Approximately 1-mm. thick wafers prepared from these mixtures were placed between two pieces of non-pretreated leno or gauze cloth of nylon yarn (25 warp filaments:den. 840 per cm. and 12 weft filaments:den. 840 per cm.; weight per square metre=440 g.) and then vulcanized in a press at a pressure of 20 kg./cm.². Strips 2.5 cm. wide were then punched out of the panels thus obtained. The force required to separate the strips of fabric from the rubber was measured at room temperature on a tensile elongation testing machine with inertial free indication. The test results were then evaluated with the aid of a stress strain diagram, and the mean value being determined in each case from the ten maximum values of one diagram. The test data set out below were each obtained from five test strips.

Bond strengths of non-impregnated nylon fabric:
  Mixture D (no additives)—0.8 kg./2.5 cm.
  Mixture E (containing 2.5% of resorcinol and 2.0% of tetramethylol-acetylene-diurea)—3.2. kg./2.5 cm.

EXAMPLE 4

The following mixtures were prepared on a set of mixing rolls:

| | Parts by weight | |
|---|---|---|
| | Mixture F | Mixture G |
| Styrene-butadiene rubber | 100.0 | 100.0 |
| HAF-carbon black | 20.0 | 20.0 |
| SAF-carbon black | 15.0 | 15.0 |
| m-Aminophenol | | 1.25 |
| Aromatic mineral oil | 8.0 | 8.0 |
| Stearic acid | 1.5 | 1.5 |
| Phenyl-α-naphthylamine | 1.5 | 1.5 |
| Zinc oxide | 5.0 | 5.0 |
| Benzothiazyl-2-cyclohexylsulphenamide | 1.25 | 1.25 |
| Thiuram-monosulphide | 0.15 | 0.15 |
| Sulphur | 1.8 | 1.8 |
| Tetramethylol-acetylene-diurea-tetramethyl-ether | | 1.25 |

The tetramethylol - acetylene - diurea - tetramethyl-ether was the last component to be added after the mixture had been cooled to approximately 90° C.

As in Example 1, rayon cord filaments impregnated as described in that example were incorporated into these mixtures during vulcanization. Further testing was also as described in Example 1. The following bond strengths were obtained.

Static bond strength of impregnated rayon cord at 80° C.:

|  | Kg. |
|---|---|
| Mixture F | 7.0 |
| Mixture G | 8.8 |

EXAMPLE 5

The following mixtures were prepared on mixing rolls:

|  | Parts by weight | |
|---|---|---|
|  | Mixture H | Mixture I |
| Butadiene-acrylonitrile rubber | 100.0 | 100.0 |
| SRF-carbon black | 30.0 | 30.0 |
| FEF-carbon black | 20.0 | 20.0 |
| m-Phenylene diamine | --- | 2.5 |
| Zinc oxide | 5.0 | 5.0 |
| Cumarone resin | 5.0 | 5.0 |
| Xylene-formaldehyde resin | 10.0 | 10.0 |
| Stearic acid | 2.5 | 2.5 |
| N-phenyl-N'-cyclohexyl-p-phenylene diamine | 0.8 | 0.8 |
| Phenyl-α-naphthylamine | 0.8 | 0.8 |
| Sulphur | 2.0 | 2.0 |
| N-diethyl-2-benzothiazylsulphenamide | 1.5 | 1.5 |
| Tetramethylol-acetylene-diurea-tetra-acetate | --- | 3.2 |

In this case, too, the tetramethylol-acetylene-diurea tetra-acetate was the last component to be added after the mixture had been cooled to approximately 90° C.

As in Example 2, non-impregnated nylon cord filaments were vulcanized into the above mixtures and then tested.

Results

Static bond strength of non-impregnated nylon cord at 80° C.:

|  | Kg. |
|---|---|
| Mixture H | 3.3 |
| Mixture I | 7.9 |

EXAMPLE 6

Tests were carried out as in Example 1, except that in this case *non*-impregnated rayon cord was used: In addition to mixture A (no further additives), a mixture K was used for comparison. The only difference between this mixture K and mixture B was that, instead of 1.3 parts of resorcinol it contained 4.4 parts by weight of resorcinol diacetate and, instead of 1.0 part by weight of tetramethylol-acetylene-diurea, 2.0 parts by weight of that substance. The following bond strengths were obtained.

|  | Mixture A | Mixture K |
|---|---|---|
| Non-impregnated rayon cord: |  |  |
| Static bond strength at 80° C., kg. | 2.2 | 8.3 |
| Dynamic bond strength at 80° C., mins. | 12 | 115 |

What we claim is:
1. A vulcanizable rubber composition containing (a) tetramethylol-acetylene-diurea or said compound having at least one of its hydroxyl groups etherified or esterified and (b) 1,5-hydroxynaphthalene or at least one compound selected from the group consisting of resorcinol, m-aminophenol, m-phenylene diamine, resorcinol diacetate, resorcinol propionate, resorcinol butyrate, resorcinol monomethyl ether or resorcinol monopropyl ether.

2. The vulcanizable rubber composition of claim 1 wherein the rubber thereof is natural rubber or butadiene, chlorobutadiene, isoprene, butadiene-styrene, butadiene-acrylonitrile, isobutylene-isoprene or ethylene-propylene rubber or a blend thereof.

3. A vulcanized rubber article reinforced with a textile wherein the bond between the textile and the rubber is improved by incorporating into said rubber, prior to vulcanization, a mixture of 0.2 to 8% by weight, based on the amount of rubber present, of (a) tetramethylol-acetylene-diurea or said compound having at least one of its hydroxyl groups etherified or esterified and from 0.5 to 2 times said percent by weight of (b) 1,5-hydroxynaphthalene or at least one compound selected from the group consisting of resorcinol, m-aminophenol, m-phenylene diamine, resorcinol diacetate, resorcinol propionate, resorcinol butyrate, resorcinol monomethyl ether or resorcinol monopropyl ether.

4. The rubber article of claim 3 wherein said textile is rayon, polyamide, polyester, polyacrylonitrile or cotton.

5. The rubber article of claim 3 wherein said rubber is natural rubber or butadiene, chlorobutadiene, isoprene, butadiene-styrene, butadiene-acrylonitrile, isobutylene-isoprene or ethylene-propylene rubber or a blend thereof.

References Cited

UNITED STATES PATENTS

| 2,689,844 | 9/1954 | Melamed | 260—72 |
| 2,803,564 | 8/1957 | Gegarine et al. | 260—69 X |
| 2,975,095 | 3/1961 | Bletso | 161—244 |
| 3,097,109 | 7/1963 | Danielson | 117—162 |
| 3,194,294 | 7/1965 | Van Gils | 152—330 |
| 3,361,617 | 1/1968 | Kaizerman | 161—247 |
| 3,405,079 | 10/1968 | Huang et. al. | 260—70 X |

JOHN T. GOOLKASIAN, Primary Examiner

C. B. COSBY, Assistant Examiner

U.S. Cl. X.R.

156—110; 161—249, 241, 259, 256; 260—3, 69, 79.5, 70, 794, 852, 840